United States Patent
Xiang et al.

(10) Patent No.: US 9,348,534 B2
(45) Date of Patent: May 24, 2016

(54) BACKUP METHOD AND COMPUTER SYSTEM THEREOF

(71) Applicant: Wistron Corporation, New Taipei (TW)

(72) Inventors: Henry Xiang, New Taipei (TW);
Lin-Bin Jiang, New Taipei (TW);
Zhi-Chun Huang, New Taipei (TW);
Tony T Li, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/198,597

(22) Filed: Mar. 6, 2014

(65) Prior Publication Data
US 2014/0258661 A1    Sep. 11, 2014

(30) Foreign Application Priority Data
Mar. 8, 2013  (CN) .......................... 2013 1 0075310

(51) Int. Cl.
| | | |
|---|---|---|
| G06F 3/00 | (2006.01) | |
| G06F 13/14 | (2006.01) | |
| G06F 13/36 | (2006.01) | |
| G06F 13/00 | (2006.01) | |
| G06F 3/06 | (2006.01) | |
| G06F 11/14 | (2006.01) | |
| G06F 13/38 | (2006.01) | |

(Continued)

(52) U.S. Cl.
CPC .............. *G06F 3/065* (2013.01); *G06F 3/0604* (2013.01); *G06F 3/0683* (2013.01); *G06F 11/1456* (2013.01); *G06F 11/1461* (2013.01); *G06F 13/387* (2013.01); *G06F 1/30* (2013.01); *G06F 11/3013* (2013.01); *G06F 11/3058* (2013.01); *G06F 11/3089* (2013.01); *G06F 2213/0032* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 8,205,104 B2 | 6/2012 | Hu | |
| 8,281,161 B2 | 10/2012 | Huang | |
| 2005/0044447 A1* | 2/2005 | Dunstan | .......................... 714/14 |

(Continued)

FOREIGN PATENT DOCUMENTS

| | | |
|---|---|---|
| EP | 0 910 089 A2 | 4/1999 |
| TW | M365529 | 9/2009 |

OTHER PUBLICATIONS

Office action mailed on Dec. 8, 2014 for the Taiwan application No. 102110727, filing date: Mar. 26, 2013, p. 1 line 12-14, p. 2-4, p. 5 line 1-14 and line 17-26 and p. 6 line 1-10.

(Continued)

*Primary Examiner* — David E Martinez
(74) *Attorney, Agent, or Firm* — Winston Hsu; Scott Margo

(57) ABSTRACT

A backup method for a computer system includes a backup module, a storage device, a south bridge circuit and a serial-advanced-technology-attachment to universal-serial-bus (SATA-to-USB) transmission line. The backup method includes when the computer system is operated in a turned off status, determining whether the backup module is coupled to a stable voltage source; when the backup module is coupled to the stable voltage source, determining a voltage level of a detection point; and when the voltage level of the detection point is a low level, initiating a backup operation of the backup module to read a plurality of data in the storage device via the SATA-to-USB transmission line.

14 Claims, 3 Drawing Sheets

(51) Int. Cl.
  *G06F 1/30* (2006.01)
  *G06F 11/30* (2006.01)

(56) References Cited

U.S. PATENT DOCUMENTS

| | | | |
|---|---|---|---|
| 2006/0242458 A1* | 10/2006 | Feldman et al. | 714/14 |
| 2007/0048920 A1* | 3/2007 | Song et al. | 438/199 |
| 2007/0074068 A1 | 3/2007 | Hsieh | |
| 2010/0100721 A1* | 4/2010 | Su et al. | 713/150 |
| 2013/0117475 A1* | 5/2013 | Wei et al. | 710/33 |

OTHER PUBLICATIONS

Office action mailed on Apr. 7, 2015 for the Taiwan application No. 102110727, filing date: Mar. 26, 2013, p. 1 line 14, p. 2-5 and p. 6 line 1-19.

* cited by examiner

BACKUP METHOD AND COMPUTER SYSTEM THEREOF

BACKGROUND OF THE INVENTION

1. Field of the Invention

The present disclosure relates to a backup method and a computer system thereof, and more particularly, to a backup method and a computer system thereof which can access and backup a plurality of data via a serial-advanced-technology-attachment to universal-serial-bus (SATA-to-USB) transmission line.

2. Description of the Prior Art

As technology advances, people are use digital files as well as pictures to process routine work and record daily lives, such that digital products and computer systems equipped with various functions have become necessary in people's daily lives. However, the digital products and the computer systems may malfunction due to inappropriate operations of the users or be accidentally broken down with an expired warranty period, which will contribute to such situations as when the users unsuccessfully access storage devices inside the digital products and/or the computer systems. Under such circumstances, if the users forgot to process a backup operation for the storage devices in advance, it will result in tremendous chaos for the users once they find it necessary to utilize/access the related data stored in the storage devices.

Thus, it is important to provide a backup method and a computer system thereof for the users who can successfully access digital files and pictures in digital products and computer systems while the digital products and the computer systems have software/hardware problems or the user failed to process backup operations in advance.

SUMMARY OF THE INVENTION

It is therefore an objective of the disclosure to provide a backup method and a computer system thereof which can access and backup a plurality of data via a serial-advanced-technology-attachment to universal-serial-bus (SATA-to-USB) transmission line.

An embodiment of the disclosure discloses a backup method for a computer system comprising a backup module, a storage device, a south bridge circuit and a serial-advanced-technology-attachment to universal-serial-bus (SATA-to-USB) transmission line. The backup method comprises when the computer system is operated in a turned off status, determining whether the backup module is coupled to a stable voltage source; when the backup module is coupled to the stable voltage source, determining a voltage level of a detection point; and when the voltage level of the detection point is a low voltage level, initiating a backup operation of the backup module to read data in the storage device via the SATA-to-USB transmission line.

An embodiment of the disclosure also discloses another computer system for processing a backup method. The computer system comprises a central processing unit; a backup module, configured to couple to a serial-advanced-technology-attachment to universal-serial-bus (SATA-to-USB) transmission line and coupled to a south bridge circuit via a sensing resistor, and comprising a transistor switch; and a storage device coupled to the backup module and the south bridge circuit for storing a programming code, and the programming code is utilized to instruct the central processing unit to process the backup method. The backup method comprises when the computer system is operated in a turned off status, determining whether the backup module is coupled to a stable voltage source; when the backup module is coupled to the stable voltage source, determining a voltage level of a detection point; and when the voltage level of the detection point is a low voltage level, initiating a backup operation of the backup module to read data in the storage device via the SATA-to-USB transmission line.

These and other objectives of the present invention will no doubt become obvious to those of ordinary skill in the art after reading the following detailed description of the preferred embodiment that is illustrated in the various figures and drawings.

DETAILED DESCRIPTION

The specification and the claims of the present disclosure may use a particular word to indicate an element, which may have diversified names named by distinct manufacturers. The present disclosure distinguishes the element depending on its function rather than its name. The phrase "comprising" used in the specification and the claim is to mean "is inclusive or open-ended but not exclude additional, un-recited elements or method steps." In addition, the phrase "electrically connected to" or "coupled" is to mean any electrical connection in a direct manner or an indirect manner. Therefore, the description of "a first device electrically connected or coupled to a second device" is to mean that the first device is connected to the second device directly or by means of connecting through other devices or methods in an indirect manner.

Figure 1:
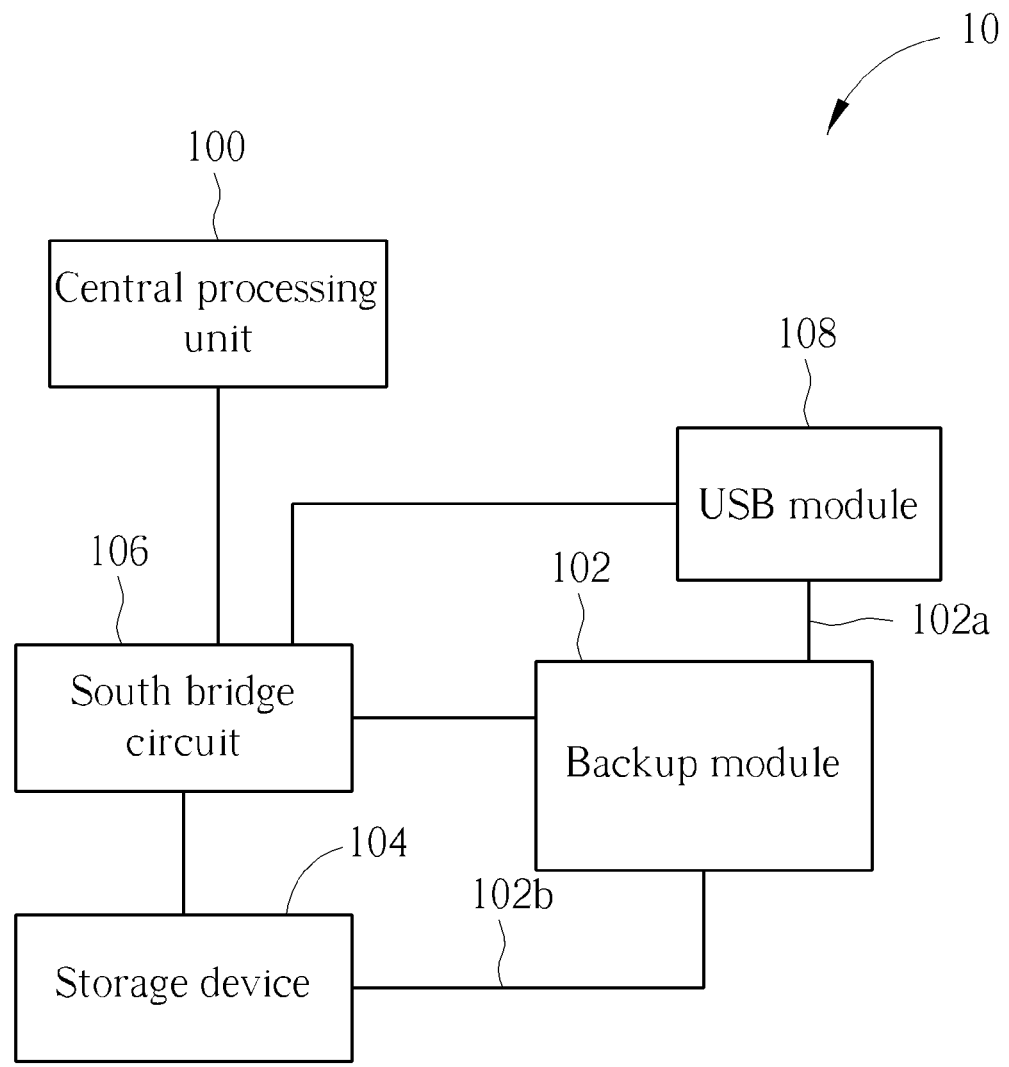
FIG. 1 illustrates a schematic diagram of a computer system according to an embodiment of the disclosure.

Please refer to FIG. 1, which illustrates a schematic diagram of a computer system 10 according to an embodiment of the disclosure. The computer system 10 comprises a central processing unit 100, a backup module 102, a storage device 104, a south bridge circuit 106 and a universal serial bus (USB) module 108. Certainly, the computer system 10 is not limited to comprising the abovementioned elements/modules/circuits only, as shown in FIG. 1. In the embodiment, the central processing unit 100 is coupled to the storage device 104 via the south bridge circuit 106. The backup module 102 is simultaneously coupled to the south bridge circuit 106, the storage device 104 and the USB module 108. Also, the USB module 108 is coupled to the south bridge circuit 106. Accordingly, the storage module 104 further stores a programming code (not shown in the figure) to instruct the backup module 102 of the computer system 10 for processing a backup method. Thus, when the computer system 10 is turned off, the backup module 102 can be utilized to replace related operations operated by the central processing unit 100. Under such circumstances, transmission lines 102a, 102b can be cooperated with the backup module 102 to build data transmission from the storage device 104 to the USB module 108. Once another computer system (not shown in the figure) is coupled to the USB module 108, it can access/read a plurality of data stored in the storage device 104. Specifically, the transmission line 102a can be realized as a USB transmission line, and the transmission line 102b can be realized as a serial-advanced-technology-attachment to USB (SATA-to-USB) transmission line.

Figure 2:
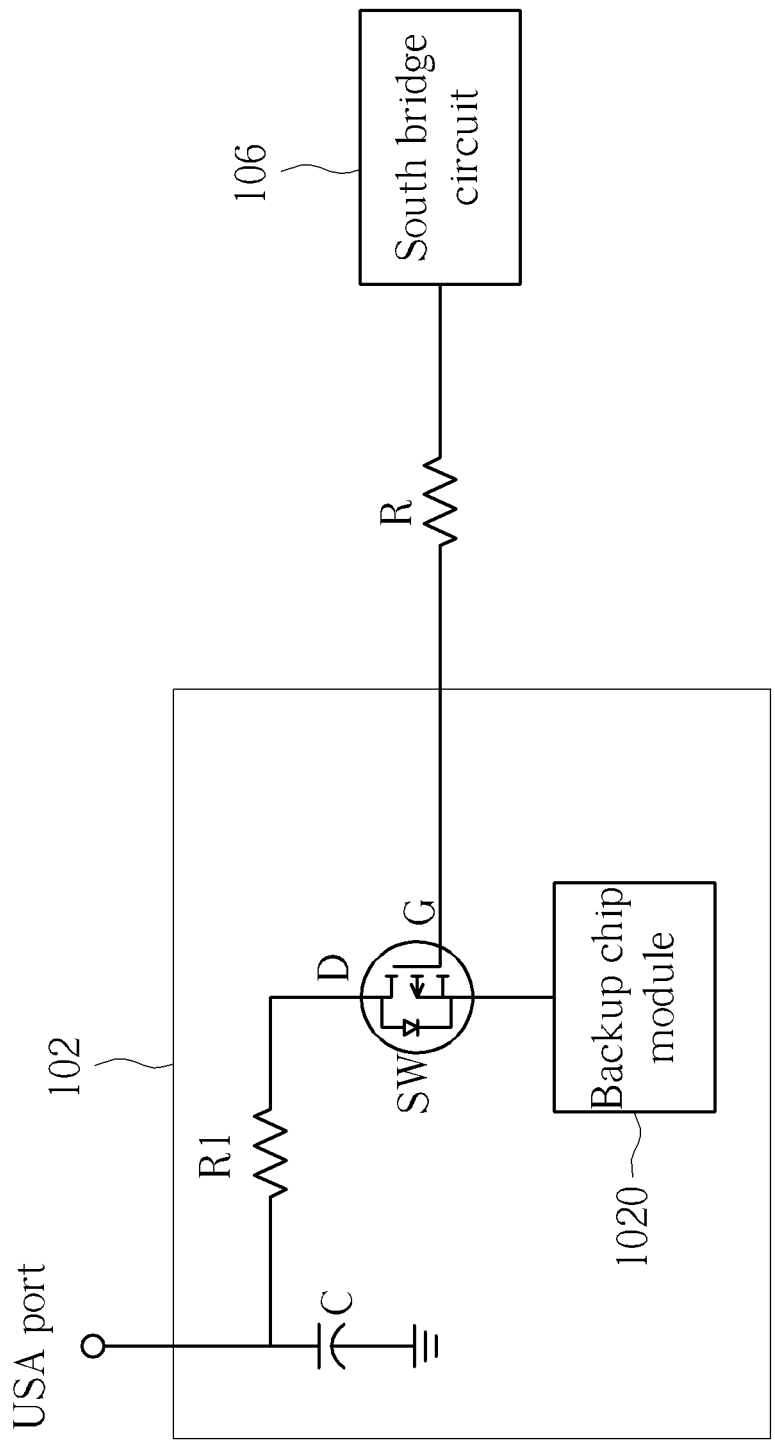
FIG. 2 illustrates a detailed schematic diagram of the backup module and the south bridge circuit shown in FIG. 1 according to an embodiment of the disclosure.

In comparison with the prior art, the computer system 10 in the embodiment can be operated in a turned off status, such that the computer system 10 (or other digital products) having software/hardware breakdowns can also be accessed/read by the user for retrieving the plurality of data stored in the storage device 104 via the backup module 102 and the backup method of the embodiment. Please refer to FIG. 2, which illustrates a detailed schematic diagram of the backup module 102 and the south bridge circuit 106 shown in FIG. 1 according to an embodiment of the disclosure. As shown in FIG. 2, the backup module 102 comprises a backup chip module 1020, a transistor switch SW, an internal resistor R1 and a capacitor C, and the south bridge circuit 106 is coupled to the backup module 102 via a sensing resistor R. Accordingly, the backup module 102 can utilize a USB port and the transmission line 102a to be coupled to the USB module 108. After another computer system (not shown in the figure) is coupled to the USB module 108, the backup chip module 1020 can be initiated to access/read the plurality of data stored in the storage device 104 via the SATA-to-USB transmission line.

Figure 3:
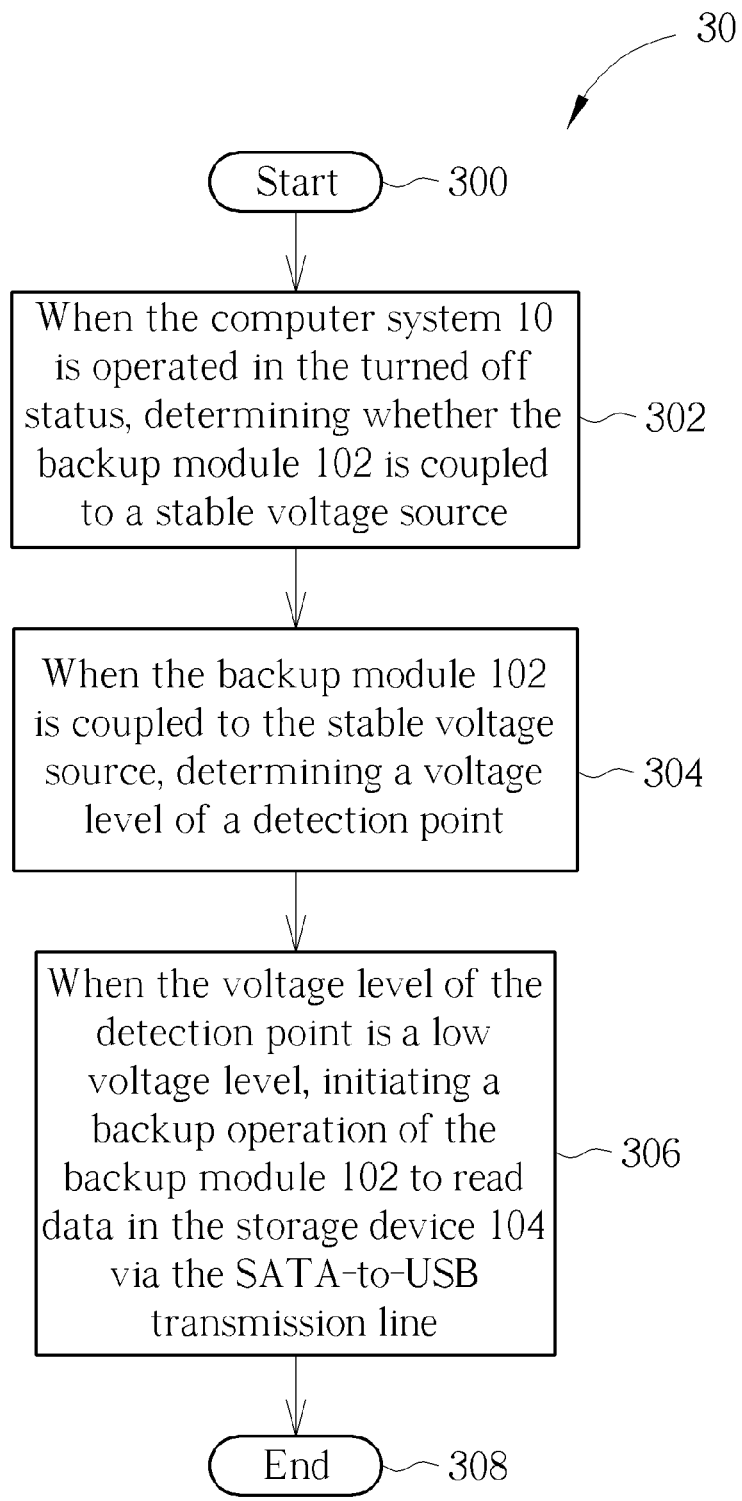
FIG. 3 illustrates a flow chart of a backup process according to an embodiment of the disclosure.

Further, the embodiments provide a backup method for the computer system 10, and the backup method can be summarized as a backup process 30 to be compiled as the programming code, as shown in FIG. 3. The backup process 30 includes the following steps.

Step 300: Start.

Step 302: When the computer system 10 is operated in the turned off status, determining whether the backup module 102 is coupled to a stable voltage source.

Step 304: When the backup module 102 is coupled to the stable voltage source, determining a voltage level of a detection point.

Step 306: When the voltage level of the detection point is a low voltage level, initiating a backup operation of the backup module 102 to read data in the storage device 104 via the SATA-to-USB transmission line.

Step 308: End.

In step 302, when the computer system 10 is operated in the turned off status (i.e. the central processing unit 100 is turned off), the embodiment will determine whether the backup module 102 is coupled to the stable voltage source. In other words, the backup process 30 will be initiated after the computer system 10 is turned off, and accordingly, will determine whether the USB module 108 is coupled to another computer system (i.e. the other computer system can be operated to provide the stable voltage source via the USB module 108), so as to determine whether the backup module 102 is supplied the stable voltage source.

In step 304, when the backup module 102 is coupled to the stable voltage source (i.e. the other computer system correspondingly provides the stable voltage source), the voltage level of the detection point will be checked accordingly. In the embodiment, the detection point is obtained as a coupled point between the backup module 102 and the sensing resistor R, such that the voltage level of the detection point can be checked to be a low voltage level or a high voltage level, so as to determine whether or not to initiate the following operations for the backup operation of the backup module 102.

In step 306, when the voltage level of the detection point is the low voltage level, the backup operation of the backup module 102 will be initiated accordingly, so as to utilize the SATA-to-USB transmission line for reading the plurality of data stored in the storage device 104. In the embodiment, the voltage level of the detection point will be checked to determine whether the low voltage level or the high voltage level, so as to correspondingly turn on/off an operation of the transistor switch SW for initiating the backup operation of the backup chip module 1020 to read/access the plurality of data in the storage device 104. When the voltage level of the detection point is the low voltage level, the embodiment will conduct the transistor switch SW to initiate the backup operation of the backup chip module 1020, and accordingly, the SATA-to-USB transmission line will be utilized to read or access the plurality of data in the storage device 104. When the voltage level of the detection point is the high voltage level, the embodiment will disconnect the transistor switch SW to terminate the backup operation of the backup chip module 1020.

Noticeably, when the voltage level of the detection point is the high voltage level, the south bridge circuit 106 will determine that the computer system 10 is supplied by the stable voltage source as functionally operating, such that the backup operation of the backup module 102 will not be initiated. When the voltage level of the detection point is the low voltage level, the south bridge circuit 106 will determine that the computer system 10 is not supplied by the stable voltage source as being turned off, such that the backup operation of the backup module 102 will be initiated. Besides, after an encoding operation is operated by another computer system with a successful certification, the backup process 30 of the embodiment can also be operated by the another computer system to initiate the backup operation of the backup module 102. Accordingly, the SATA-to-USB transmission line can establish communications between the storage device 104 and the another computer system, and the another computer system can access/read the plurality of data in the storage device 104.

In simple, the embodiments provide the computer system 10 and the backup process 30 to initially determine whether the computer system 10 is turned off and the south bridge circuit 106 is isolated from stable voltage source. Next, the USB module 108 is utilized to supply the backup chip module 1020 with the stable voltage source via another computer system. Under such circumstances, the SATA-to-USB transmission line can bridge the communications between the storage device 104 and the other computer system. Furthermore, the encoding operation can also be processed in the embodiment, such that the user can utilize other computer systems to read the plurality of data in the storage device 104 once the user (or the other computer system) correctly passes a certification of the encoding operation. Accordingly, the backup process 30 and the backup module 102 of the embodiments can be cooperated to process the backup operation and read the plurality of data in the storage device 104 even if the computer system 10 has hardware/software problems.

Certainly, those skilled in the art can utilize the SATA-to-USB transmission line and the backup module 102 to communicate with other digital products and the storage device 104, such that the user can still retrieve the plurality of data in the storage device 104 via the backup module 104 even though the backup operation for the plurality of data is not operated in advance. Besides, the embodiments shown in FIG. 1 and FIG. 2 are demonstrated as illustrations, and those skilled in the art can adaptively integrate the backup module 102 and the SATA-to-USB transmission line (i.e. the transmission line 102b) to form another backup device. Accordingly, the backup device can be disposed outside the computer system 10 for reading the plurality of data in the storage device 104 after a successful connection with another computer system as the stable voltage source is provided. Additionally, the transistor switch SW in the backup module 102 and the sensing resistor R can also be integrated as another switch module to determine the voltage level of the detection point, so as to adaptively control the backup operation of the backup chip module 1020, which is also in the scope of the disclosure.

In summary, the embodiments provide a backup method and a computer system thereof. After the computer system is turned off and a backup module is supplied with a stable voltage source, a SATA-to-USB transmission line can be utilized to bridge a signal communication between a storage device and an external digital product. Under such circumstances, when the computer system has software/hardware breakdowns, the backup module of the computer system can function to adaptively process the backup operation and read/access the plurality of data in the storage device. In comparison with the prior art, the embodiments provide not only related mechanisms of the backup method but also an encoding operation for certifying users' authorities. Thus, the plurality of data can be adaptively protected with improved certification operation to enlarge the application range of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backup method for a first computer system comprising a backup module, a storage device, a south bridge circuit and a serial-advanced-technology-attachment to universal-serial-bus (SATA-to-USB) transmission line, the backup method comprising:
   when the first computer system is operated in a turned off status, the first computer system determining whether the backup module is coupled to a stable voltage source;
   when the backup module is coupled to the stable voltage source, the first computer system determining a voltage level of a detection point; and
   when the voltage level of the detection point is a low voltage level, a second computer system initiating a backup operation of the backup module to read data in the storage device of the first computer system via the SATA-to-USB transmission line;
   wherein the second computer system comprises a storage device for storing a programming code which instructs a central processing unit of the second computer system to process a certification of an encoding operation before the second computer system reads the data in the storage device of the first computer system.

2. The backup method of claim 1, further comprising:
   when the backup module is not coupled to the stable voltage source, not initiating the backup operation of the backup module.

3. The backup method of claim 1, wherein the detection point is a coupled point between the backup module and a sensing resistor.

4. The backup method of claim 3, wherein the step of when the backup module is coupled to the stable voltage source, determining the voltage level of the detection point further comprises:
   obtaining the voltage level of the coupled point to determine whether the voltage level is the low voltage level.

5. The backup method of claim 4, further comprising:
   when the voltage level is not the low voltage level, switching a transistor switch to be disconnected, so as to turn off the backup operation of the backup module.

6. The backup method of claim 5, wherein the step of when the voltage level of the detection point is the low voltage level, initiating the backup operation of the backup module to read the data in the storage device via the SATA-to-USB transmission line further comprises:
   conducting the transistor switch to initiate the backup operation of the backup module, so as to read the data in the storage device via the SATA-to-USB transmission line.

7. The backup method of claim 1, further comprising utilizing the second computer system to operate the encoding operation, and when a user correctly passes the certification of the encoding operation, the backup module reads the data in the storage device via the SATA-to-USB transmission line.

8. A first computer system for processing a backup method, the first computer system comprising:
   a central processing unit;
   a backup module, configured to couple to a serial-advanced-technology-attachment to universal-serial-bus (SATA-to-USB) transmission line and coupled to a south bridge circuit via a sensing resistor, and comprising a transistor switch; and
   a storage device coupled to the backup module and the south bridge circuit for storing a programming code, and the programming code is utilized to instruct the central processing unit to process the backup method, the backup method comprising:
      when the first computer system is operated in a turned off status, the first computer system determining whether the backup module is coupled to a stable voltage source;
      when the backup module is coupled to the stable voltage source, the first computer system determining a voltage level of a detection point; and
      when the voltage level of the detection point is a low voltage level, a second computer system initiating a backup operation of the backup module to read data in the storage device of the first computer system via the SATA-to-USB transmission line;
   wherein the second computer system comprises another storage device for storing another programming code which instructs another central processing unit of the second computer system to process a certification of an encoding operation before the second computer system reads the data in the storage device of the first computer system.

9. The first computer system of claim 8, wherein the backup method further comprises:
   when the backup module is not coupled to the stable voltage source, not initiating the backup operation of the backup module.

10. The first computer system of claim 8, wherein the detection point is a coupled point between the backup module and the sensing resistor.

11. The first computer system of claim 10, wherein the step of when the backup module is coupled to the stable voltage source, determining the voltage level of the detection point further comprises:
   obtaining the voltage level of the coupled point to determine whether the voltage level is the low voltage level.

12. The first computer system of claim 11, wherein the backup method further comprises:
   when the voltage level is not the low voltage level, switching the transistor switch to be disconnected, so as to turn off the backup operation of the backup module.

13. The first computer system of claim 12, wherein the step of when the voltage level of the detection point is the low voltage level, initiating the backup operation of the backup module to read the data in the storage device via the SATA-to-USB transmission line further comprises:
   conducting the transistor switch to initiate the backup operation of the backup module, so as to read the data in the storage device via the SATA-to-USB transmission line.

14. The first computer system of claim 8, wherein the backup method further comprises utilizing the second computer system to operate the encoding operation, and when a user correctly passes the certification of the encoding operation, the backup module reads the data in the storage device via the SATA-to-USB transmission line.

* * * * *